UNITED STATES PATENT OFFICE.

CONRAD SEMPER, OF PHILADELPHIA, PENNSYLVANIA.

UTILIZING WASTE CALCIUM CHLORIDE AND SULPHATE.

SPECIFICATION forming part of Letters Patent No. 292,260, dated January 22, 1884.

Application filed April 23, 1883. (No specimens.)

*To all whom it may concern:*

Be it known that I, CONRAD SEMPER, of the city and county of Philadelphia, and State of Pennsylvania, have invented a new and useful method of utilizing the waste products obtained in the manufacture of acetic acid from acetate of lime, of which the following is a specification.

In the manufacture of acetic acid, acetate of lime is treated, as is well known, with sulphuric acid, whereby the acetic acid is freed from its base and passes off and is collected in any well-known manner, with the result that an impure sulphate of calcium is produced, which product has heretofore been considered valueless by reason of its being impregnated or mixed with foreign impurities—such as tar or other carbonaceous matters—and with free or uncombined acid.

I have discovered that by treating this waste product—viz., sulphate of calcium—in a furnace of proper construction by subjecting it therein to a high temperature the impurities above named are burned out or driven off, whereby there results a calcined mass of white color, consisting, essentially, of sulphate of calcium fit for use for the various purposes for which said article is employed in the arts—that is to say, paris-white or plaster-of-paris results, according to the degree of calcination of the mass.

I do not confine myself to any specific kind or construction of furnace in carrying out the process described, as any furnace can be employed in which a strong oxidizing heat can be obtained. Preferably a reverberatory furnace with mechanical stirrers, whereby the mass can be constantly exposed to the oxidizing heat, is used.

I do not confine myself to the use of any special fuel, although gaseous fuel may be employed with good results.

Having thus described my invention, I claim—

The method of utilizing waste sulphate of calcium produced in the manufacture of acetic acid from acetate of lime, which consists in subjecting said product to a high temperature, as and for the purpose described.

In testimony whereof I have hereunto signed my name this 21st day of April, A. D. 1883.

CONRAD SEMPER.

In presence of—
   W. C. STRAWBRIDGE,
   J. BONSALL TAYLOR.